United States Patent
Liang et al.

(10) Patent No.: US 12,113,246 B2
(45) Date of Patent: Oct. 8, 2024

(54) BATTERY, APPARATUS USING BATTERY, AND PREPARATION METHOD AND PREPARATION DEVICE OF BATTERY

(71) Applicant: CONTEMPORARY AMPEREX TECHNOLOGY (HONG KONG) LIMITED, Hong Kong (CN)

(72) Inventors: Chengdu Liang, Ningde (CN); Xiaofu Xu, Ningde (CN); Yonghuang Ye, Ningde (CN); Haizu Jin, Ningde (CN); Wenwei Chen, Ningde (CN); Qian Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 44 days.

(21) Appl. No.: 18/054,698

(22) Filed: Nov. 11, 2022

(65) Prior Publication Data

US 2023/0066562 A1    Mar. 2, 2023

Related U.S. Application Data

(63) Continuation of application No. PCT/CN2020/129476, filed on Nov. 17, 2020.

(51) Int. Cl.
*H01M 50/578* (2021.01)
*H01M 50/209* (2021.01)
*H01M 50/581* (2021.01)

(52) U.S. Cl.
CPC ....... *H01M 50/578* (2021.01); *H01M 50/209* (2021.01); *H01M 50/581* (2021.01); *H01M 2220/20* (2013.01)

(58) Field of Classification Search
CPC . Y02E 60/10; H01M 2220/20; H01M 50/578; H01M 50/209; H01M 50/581;
(Continued)

(56) References Cited

U.S. PATENT DOCUMENTS

| 6,278,259 B1 | 8/2001 | Kimoto et al. |
| 8,399,114 B2 | 3/2013 | Kishii et al. |

(Continued)

FOREIGN PATENT DOCUMENTS

| CN | 201498554 U | 6/2010 |
| CN | 102484235 A | 5/2012 |

(Continued)

OTHER PUBLICATIONS

English Translation of CN103311562.*
(Continued)

*Primary Examiner* — Kiran Quraishi Akhtar
(74) *Attorney, Agent, or Firm* — Anova Law Group, PLLC

(57) ABSTRACT

A battery includes a protective box provided with a guiding channel and a plurality of battery cells in the protective box. The plurality of battery cells include a first battery cell and a second battery cell adjacent to each other. The first battery cell includes a pressure relief end provided with a pressure relief mechanism. The pressure relief mechanism is configured to actuate release of internal pressure of the first battery cell in response to the internal pressure or an internal temperature of the first battery cell reaching a threshold. The guiding channel is configured to guide emissions released from the pressure relief mechanism. The pressure relief end of the first battery cell is staggered with one end of the second battery cell that is close to the pressure relief end, in a direction leaving the guiding channel.

10 Claims, 14 Drawing Sheets

(58) Field of Classification Search
CPC ........... H01M 10/0525; H01M 50/358; H01M 50/392; H01M 50/375
See application file for complete search history.

(56) References Cited

U.S. PATENT DOCUMENTS

| | | | |
|---|---|---|---|
| 10,003,055 B2 | 6/2018 | Shimizu et al. | |
| 10,608,304 B2 | 3/2020 | Ruehle et al. | |
| 2010/0055556 A1* | 3/2010 | Meschter | H01M 50/289 429/82 |
| 2011/0070478 A1 | 3/2011 | Meschter | |
| 2012/0189885 A1* | 7/2012 | Kishii | H01M 50/51 429/82 |
| 2016/0155995 A1 | 6/2016 | Takahata | |
| 2016/0204404 A1 | 7/2016 | Shimizu et al. | |
| 2018/0269448 A1 | 9/2018 | Shimizu et al. | |
| 2018/0316073 A1 | 11/2018 | Ruehle et al. | |
| 2020/0203788 A1* | 6/2020 | Kang | H01M 10/653 |

FOREIGN PATENT DOCUMENTS

| | | | | |
|---|---|---|---|---|
| CN | 103311562 | * | 9/2013 | ............ H01M 10/04 |
| CN | 103311562 A | | 9/2013 | |
| CN | 104319360 A | | 1/2015 | |
| CN | 110190212 A | | 8/2019 | |
| CN | 110720158 A | | 1/2020 | |
| IN | 108807726 A | | 11/2018 | |
| KR | 20190023917 A | | 3/2019 | |
| WO | WO2019143060 | * | 7/2019 | ........ H01M 10/6551 |

OTHER PUBLICATIONS

The World Intellectual Property Organization (WIPO) International Search Report and Written Opinion for PCT/CN2020/129476 Aug. 20, 2021 15 pages (including English translation).
The European Patent Office (EPO) Extended Search Report for EP Application No. 20961839.6 Aug. 16, 2023 10 Pages.
China National Intellectual Property Administration (CNIPA) Office Action 1 for Application No. 202080102561.6, Jun. 18, 2024 12 Pages (including translation).

* cited by examiner

BATTERY, APPARATUS USING BATTERY, AND PREPARATION METHOD AND PREPARATION DEVICE OF BATTERY

CROSS-REFERENCE TO RELATED APPLICATION

This application is a continuation of International Application No. PCT/CN2020/129476, filed Nov. 17, 2020, the entire content of which is incorporated herein by reference.

TECHNICAL FIELD

This application relates to the field of battery technologies, and in particular, to a battery, an apparatus using a battery, and a preparation method and preparation device of battery.

BACKGROUND

Apparatuses such as automobiles, electric bicycles, ships, and energy storage cabinets include batteries. The batteries provide electrical energy for the apparatuses.

A battery includes a plurality of battery cells and a box body. The plurality of battery cells are arranged in sequence, and the box body surrounds the plurality of battery cells and protects the plurality of battery cells. The box body is provided with positive and negative electrodes, and each battery cell is connected to the positive and negative electrodes. When the battery is working, active materials and electrolyte inside the battery cells react chemically with each other to provide electrical energy for a load. A battery cell is provided with a pressure relief mechanism that is configured to actuate release of internal pressure of the battery cell when the internal pressure or internal temperature of the battery cell reaches a threshold. Emissions of the battery cells released through the pressure relief mechanism enter a space formed between the battery cells and the box body.

However, when some of the battery cells in the battery generate a large amount of gas, both volume and pressure of the emissions are large, likely to result in cracking of the box body and poorer safety performance of the battery.

SUMMARY

Embodiments of this application provide a battery, an apparatus using a battery, and a preparation method and preparation device of battery. Such battery can accommodate more emissions and offers better safety performance.

To achieve the foregoing objective, the embodiments of this application provide the following technical solutions:

A first aspect of the embodiments of this disclosure provides a battery, including a plurality of battery cells, where at least one of the battery cells is provided with a pressure relief mechanism, and the pressure relief mechanism is configured to actuate release of internal pressure of the battery cell when the internal pressure or internal temperature of the battery cell reaches a threshold; and a protective box, where the protective box is configured to protect the plurality of battery cells, and the protective box is provided with a guiding channel, where the guiding channel is configured to guide emissions released from the pressure relief mechanism; where the plurality of battery cells include a first battery cell and a second battery cell that are arranged adjacently, the first battery cell includes a pressure relief end at which the pressure relief mechanism is provided, and the pressure relief end of the first battery cell is staggered with one end of the second battery cell that is close to the pressure relief end, in a direction leaving the guiding channel, so as to increase a volume of the guiding channel.

In some optional embodiments, the protective box includes a protective plate, the protective plate is spaced apart from the plurality of battery cells, and the guiding channel is formed between the protective plate and the plurality of battery cells; and the protective plate is provided with a recess, the recess is configured to increase the volume of the guiding channel, the recess formed by recessing the protective plate toward a side that faces away from the plurality of battery cells, the recess has an inner chamber, and the inner chamber is configured to communicate with the guiding channel.

In some optional embodiments, the recess is opposite the first battery cell.

In some optional embodiments, the protective box includes a supporting plate, the supporting plate is attached to the plurality of battery cells, and the guiding channel is provided on one side of the supporting plate away from the plurality of battery cells; and the supporting plate is provided with through holes for the emissions to pass through, where the through holes communicate with the guiding channel.

In some optional embodiments, an energy density of the first battery cell is greater than an energy density of the second battery cell.

In some optional embodiments, an energy density of the first battery cell is 1.1 to 1.6 times the energy density of the second battery cell.

In some optional embodiments, the first battery cell and the second battery cell are both provided in plurality, and the first battery cells and the second battery cells are arranged alternately with n first battery cells and m second battery cells, n≥1, and m≥1.

The battery provided in the embodiments of this application has the following advantages over conventional technology: the battery includes a plurality of battery cells and a protective box, where the plurality of battery cells are disposed in the protective box so that the protective box can protect the plurality of battery cells. The plurality of battery cells include a first battery cell and a second battery cell, and a pressure relief end of the first battery cell is staggered with one end of the second battery cell that is close to the pressure relief end, in a direction leaving the guiding channel, so as to increase a volume of the guiding channel. This facilitates a larger relief buffer space in the protective box, and therefore, the protective box can accommodate more emissions, ensuring better safety performance of the battery.

A second aspect of the embodiments of this disclosure provides an apparatus using a battery, including the battery according to the first aspect, where the battery provides electrical energy for the apparatus.

A third aspect of the embodiments of this disclosure provides a preparation method of battery, used for preparing the battery according to the first aspect, and including: providing a plurality of battery cells, where at least one of the battery cells is provided with a pressure relief mechanism, and the plurality of battery cells comprise a first battery cell and a second battery cell that are arranged adjacently; providing a protective box; installing the plurality of battery cells in the protective box, where the protective box is provided with a guiding channel; and staggering a pressure relief end of the first battery cell and one end of the second battery cell that is close to the pressure relief end.

A fourth aspect of the embodiments of this disclosure provides a preparation device of battery, used for preparing the battery according to the first aspect, and including: a battery cell preparation module, configured to prepare the plurality of battery cells, where at least one of the battery cells is provided with a pressure relief mechanism, and the plurality of battery cells include a first battery cell and a second battery cell that are arranged adjacently; a protective box preparation module, configured to prepare the protective box; an assembly module, configured to install the plurality of battery cells in the protective box, where a pressure relief end of the first battery cell is staggered with one end of the second battery cell that is close to the pressure relief end.

BRIEF DESCRIPTION OF DRAWINGS

To describe the technical solutions in the embodiments of this application more clearly, the following briefly describes the accompanying drawings used for describing the embodiments of this application. Apparently, the accompanying drawings in the following description show merely some embodiments of this application, and a person of ordinary skill in the art may still derive other drawings from the accompanying drawings without creative efforts.

Figure 1:
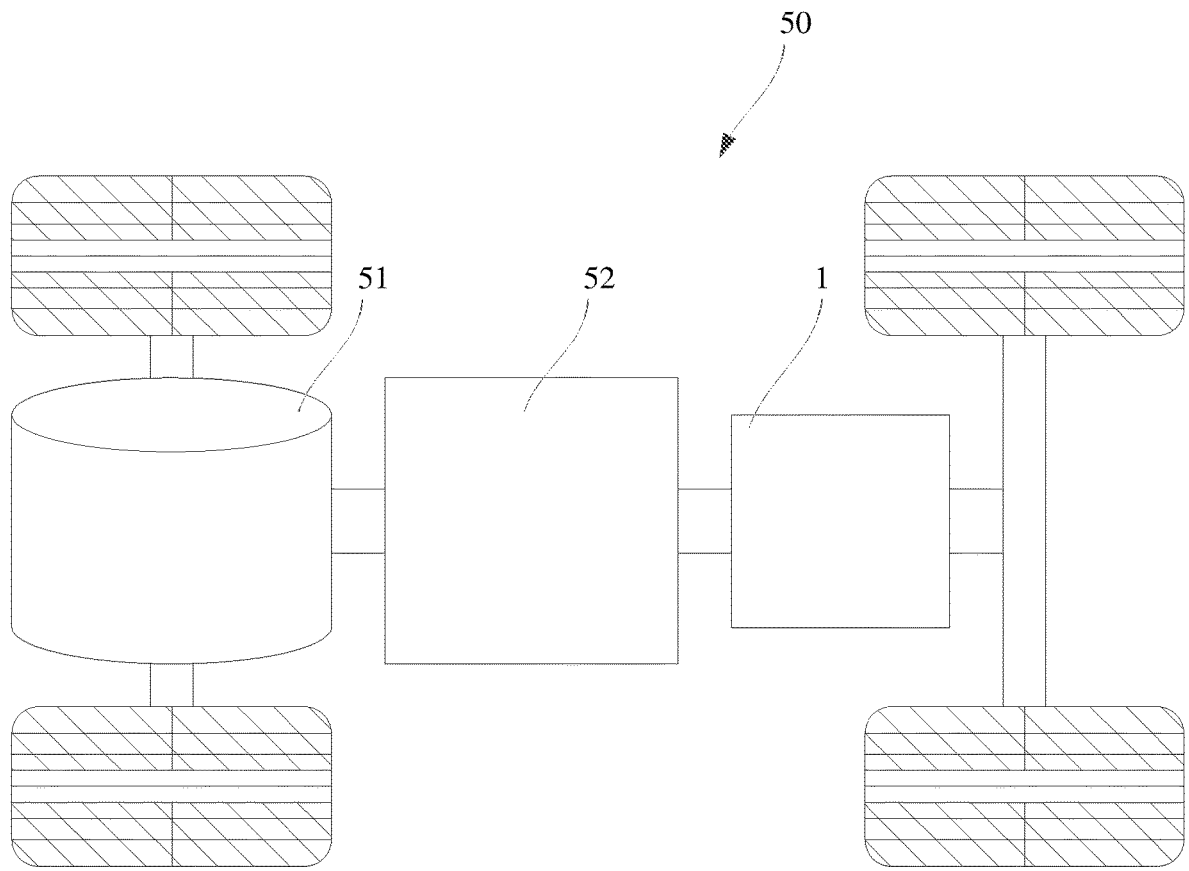
FIG. 1 is a schematic structural diagram of an apparatus using a battery according to an embodiment of this application.

In the accompanying drawings, the figures are not necessarily drawn to scale.

Reference numerals are described as follows:

1. battery 10. battery cell; 101. first battery cell; 102. second battery cell; 11. electrode assembly; 111. positive tab; 112. negative tab; 12. positive electrode terminal; 13. negative electrode terminal; 14. pressure relief mechanism; 15. housing;

20. protective box; 21. protective plate; 211. recess; 22. supporting plate; 221. through hole; 23. side plate; 24. base plate;

30. elastic member;
40. guiding channel;
50. vehicle; 51. drive mechanism; 52. control mechanism.

DETAILED DESCRIPTION OF EMBODIMENTS

The following further describes the embodiments of this application in detail with reference to the accompanying drawings and examples. The detailed description and accompanying drawings of the following embodiments are used to illustrate the principle of this application, but are not intended to limit the scope of this application, meaning that this application is not limited to the described embodiments.

In the descriptions of this application, it should be noted that, unless otherwise stated, "plurality" means two or more; and the orientations or positional relationships indicated by the terms "upper", "lower", "left", "right", "inside", "outside", and the like are merely intended to help the descriptions of this application and simplify the descriptions other than indicate or imply that the apparatuses or components must have specific orientations, or be constructed and manipulated with specific orientations, and therefore shall not be construed as limitations on this application. In addition, the terms "first", "second", and "third" are merely intended for purpose of description, and shall not be understood as an indication or implication of relative importance. "Vertical" means being vertical with an allowable range of error. "Parallel" means being parallel with an allowable range of error.

The orientation terms appearing in the following description all indicate directions shown in the figures, and do not limit the specific structure of the application. In the descriptions of this application, it should be further noted that unless otherwise specified and defined explicitly, the terms "install", "link", "connection", and "attachment" should be understood in their general senses. For example, the terms may be a fixed connection, a detachable connection, or an integrated connection, or may be a direct connection or an indirect connection through an intermediate medium. A person of ordinary skill in the art can understand specific meanings of these terms in this application as appropriate to specific situations.

In conventional technology, a battery includes a plurality of battery cells arranged side by side and a protective box surrounding the battery cells, with a guiding channel formed in the protective box. As such, when a pressure relief mechanism of a battery cell is actuated, emissions in the battery cell are released to the guiding channel through the pressure relief mechanism. However, when some of the battery cells generate a large amount of emissions, volume and pressure of the emissions are both large, likely to result in cracking of the protective box and poorer safety performance of the battery.

In view of this, the plurality of battery cells provided in the embodiments of this application include at least one first battery cell and one secondary battery cell that are staggered with each other, and one of the first battery cell and the second battery cell is displaced in a direction leaving the guiding channel. This increases a volume of the guiding channel, facilitating a larger relief buffer space in the protective box. Therefore, the protective box allows passage of a larger volume of emissions, ensuring better safety performance of the battery.

FIG. 1 is a schematic structural diagram of an apparatus using a battery provided in an embodiment of this application.

Referring to FIG. 1, this embodiment of this application provides an apparatus using a battery. The apparatus may be a mobile device such as a vehicle 50, a ship, or a small aircraft, or a non-mobile device capable of providing electrical energy, such as an energy storage cabinet. Using the vehicle 50 as an example, the vehicle 50 may be a new energy vehicle, where the new energy vehicle may be a battery electric vehicle, a hybrid electric vehicle or a range-extended vehicle. The vehicle 50 may include a drive mechanism 51, a control mechanism 52, and a battery 1, where the control mechanism 52 is electrically connected to the drive mechanism 51, and configured to control start and stop of the drive mechanism 51 as required, so as to drive or park the vehicle 50. The battery 1 is electrically connected to the control mechanism 52, and configured to provide electrical energy for the control mechanism 52. Power consuming components in the vehicle 50 may also include audio devices and the like.

Figure 2:
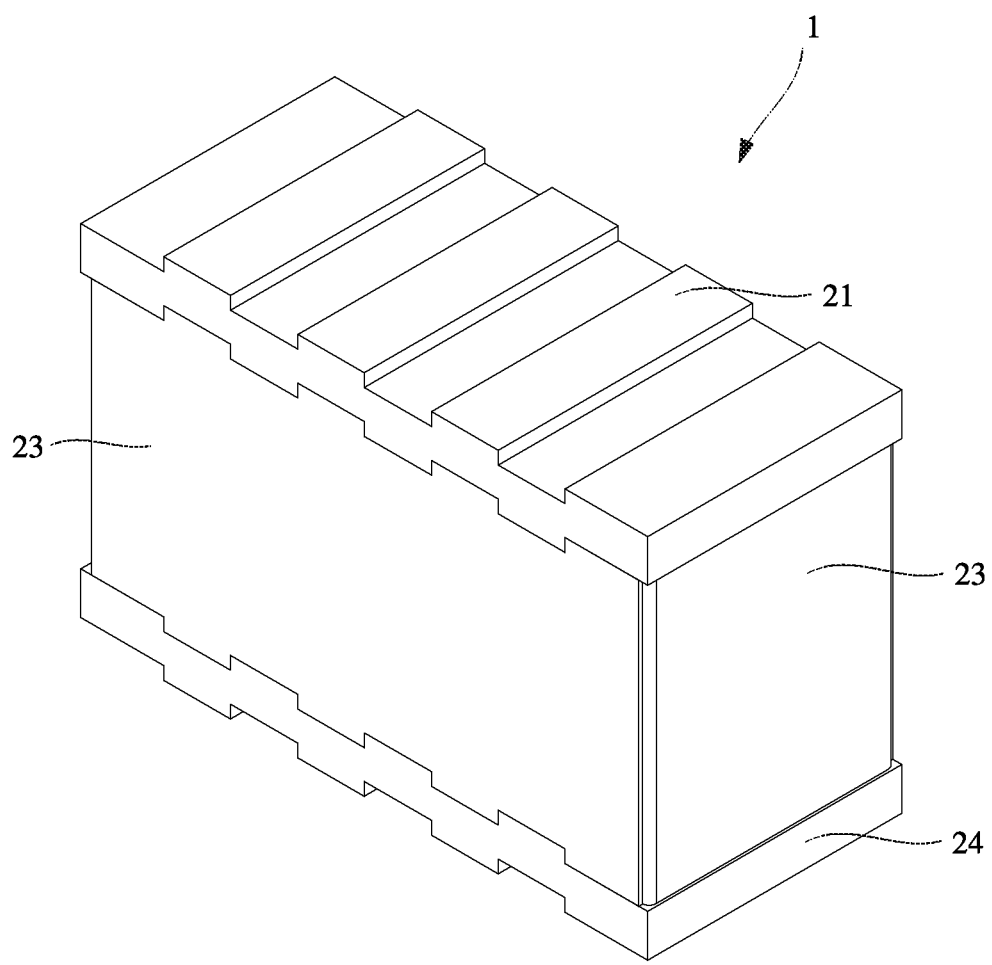
FIG. 2 is a first schematic structural diagram of a battery according to an embodiment of this application.
Figure 3:
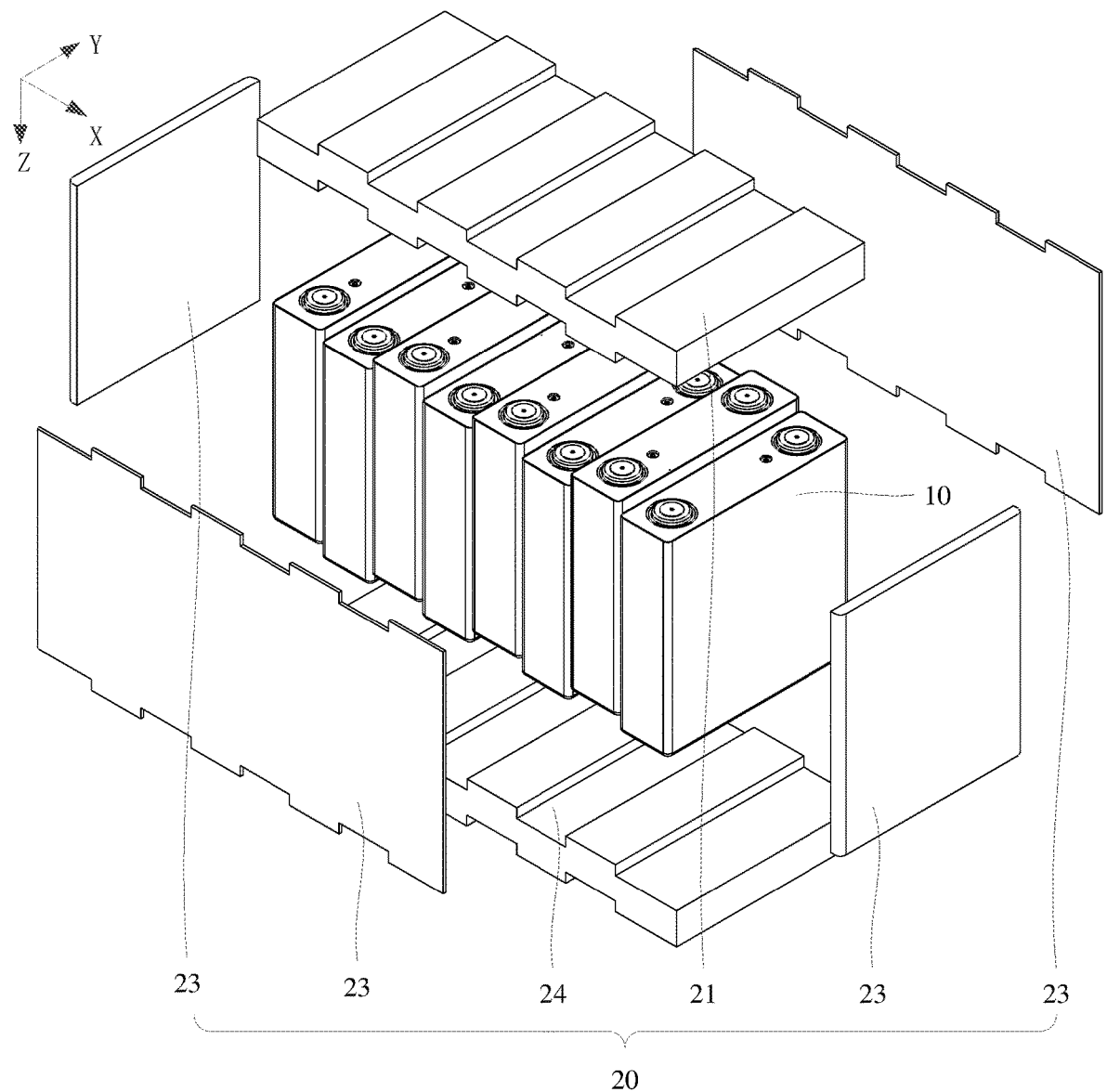
FIG. 3 is an exploded view of the battery shown in FIG. 2.
Figure 4:
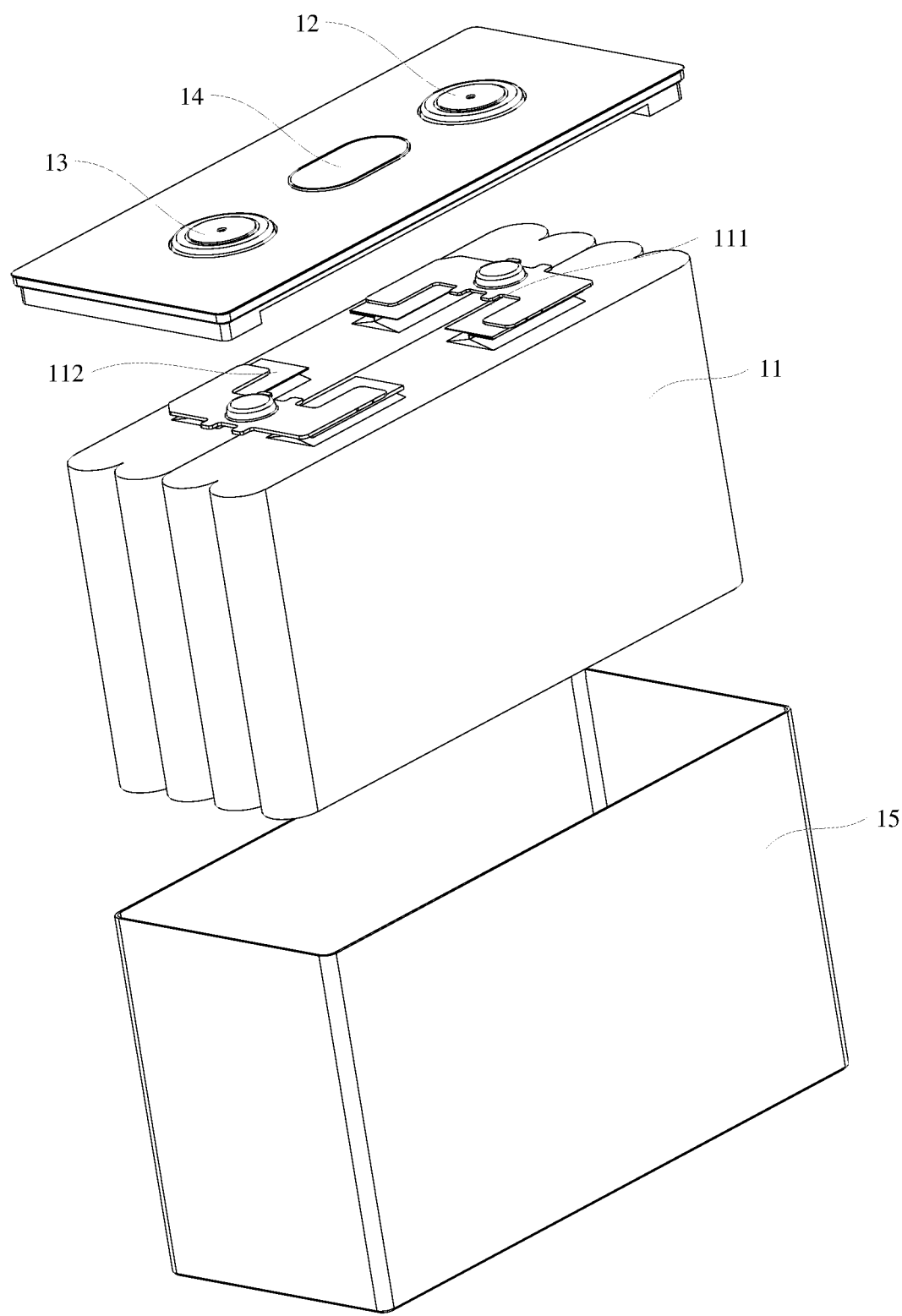
FIG. 4 is a schematic structural diagram of a battery cell in FIG. 3 with a pressure relief mechanism located at the top.
Figure 5:
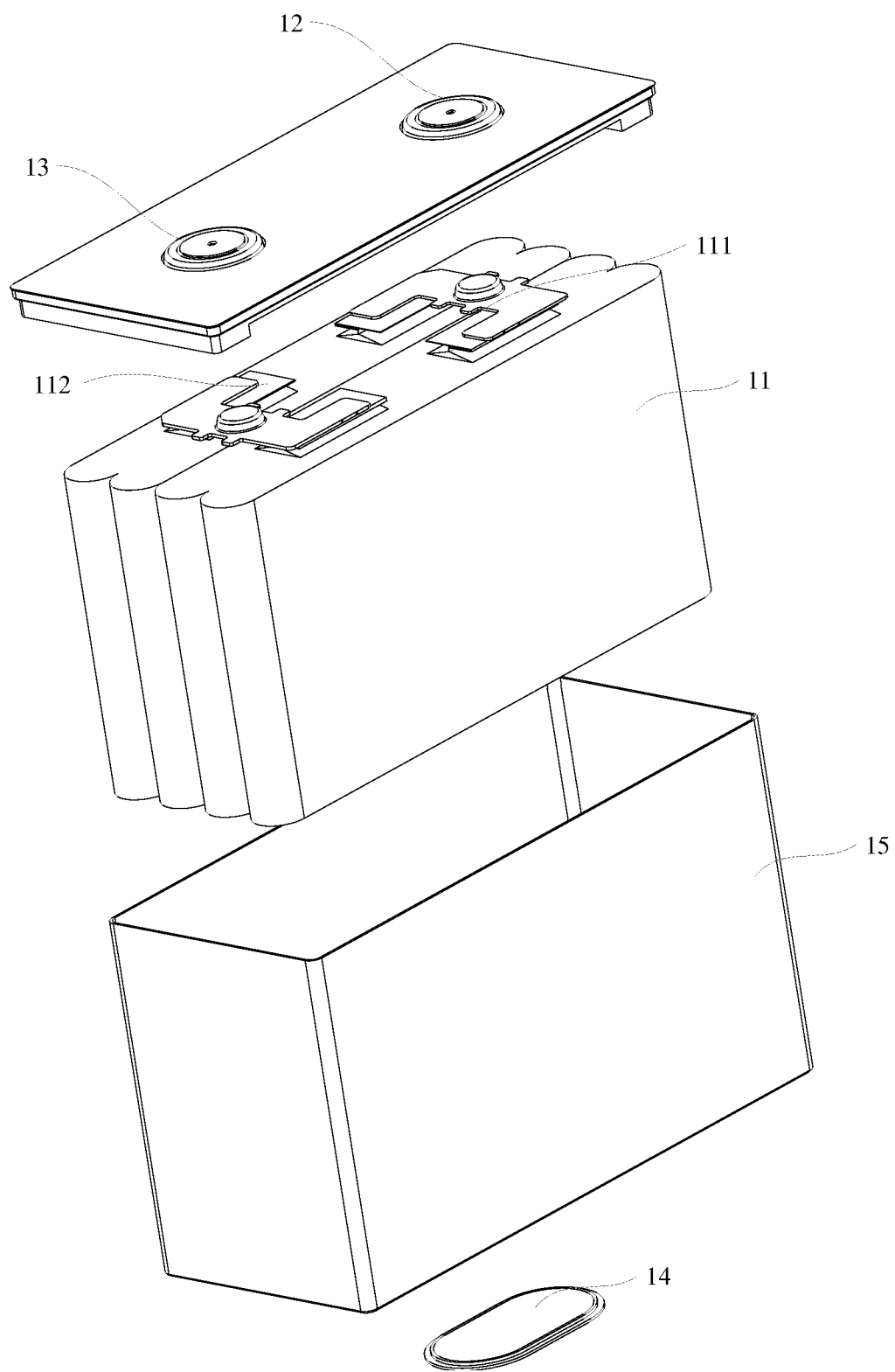
FIG. 5 is a schematic structural diagram of a battery cell in FIG. 3 with a pressure relief mechanism located at the bottom.
Figure 6:
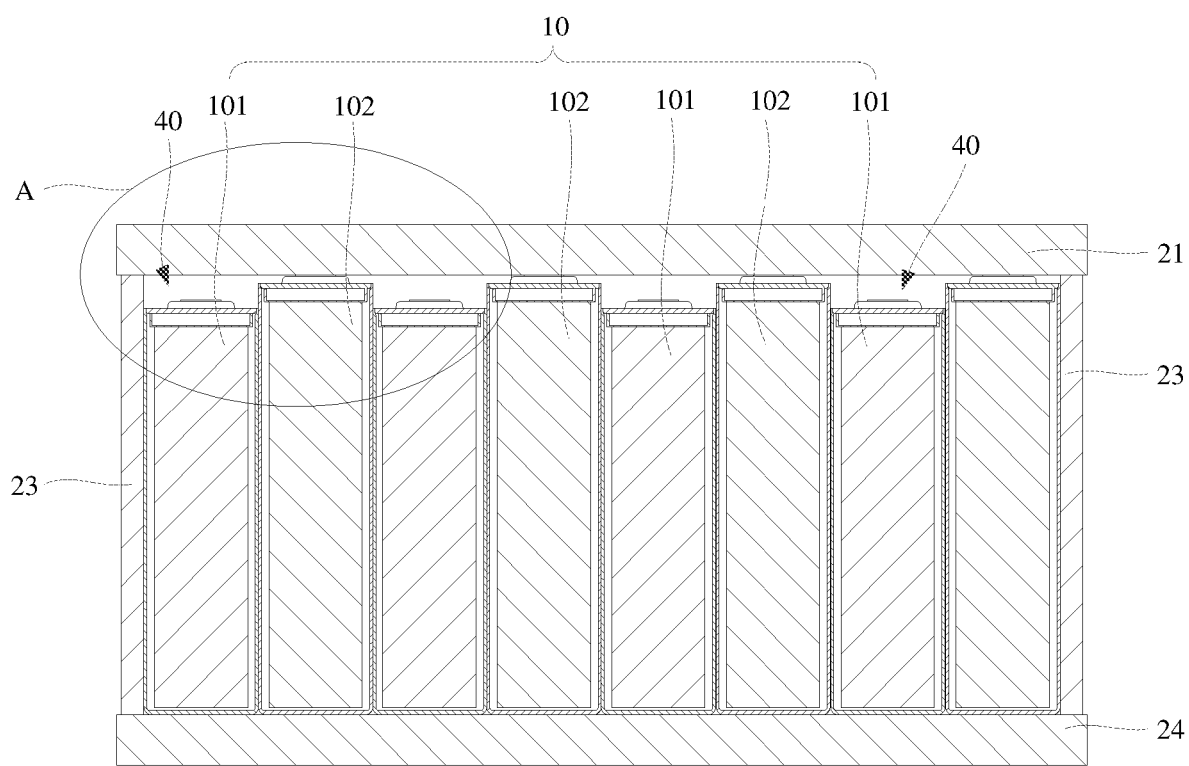
FIG. 6 is a second schematic structural diagram of a battery according to an embodiment of this application.
Figure 7:
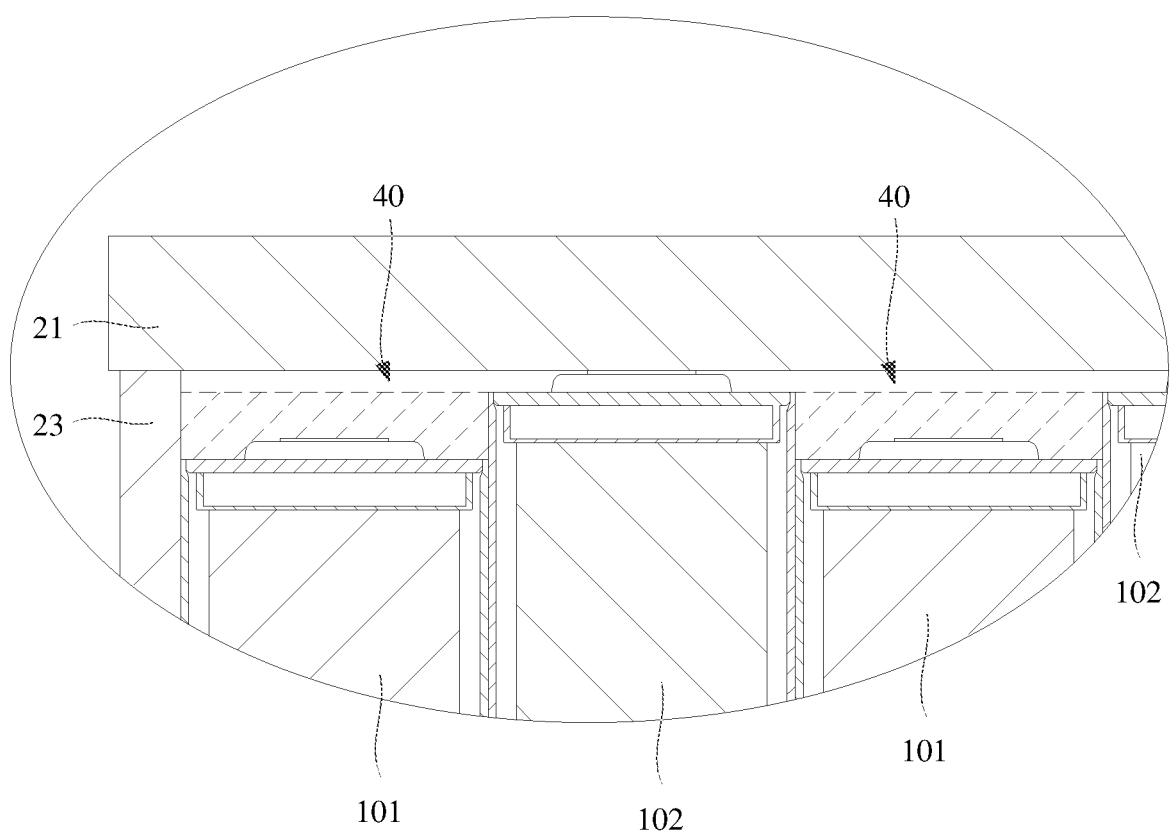
FIG. 7 is a schematic structural diagram of portion A in FIG. 6.
Figure 8:
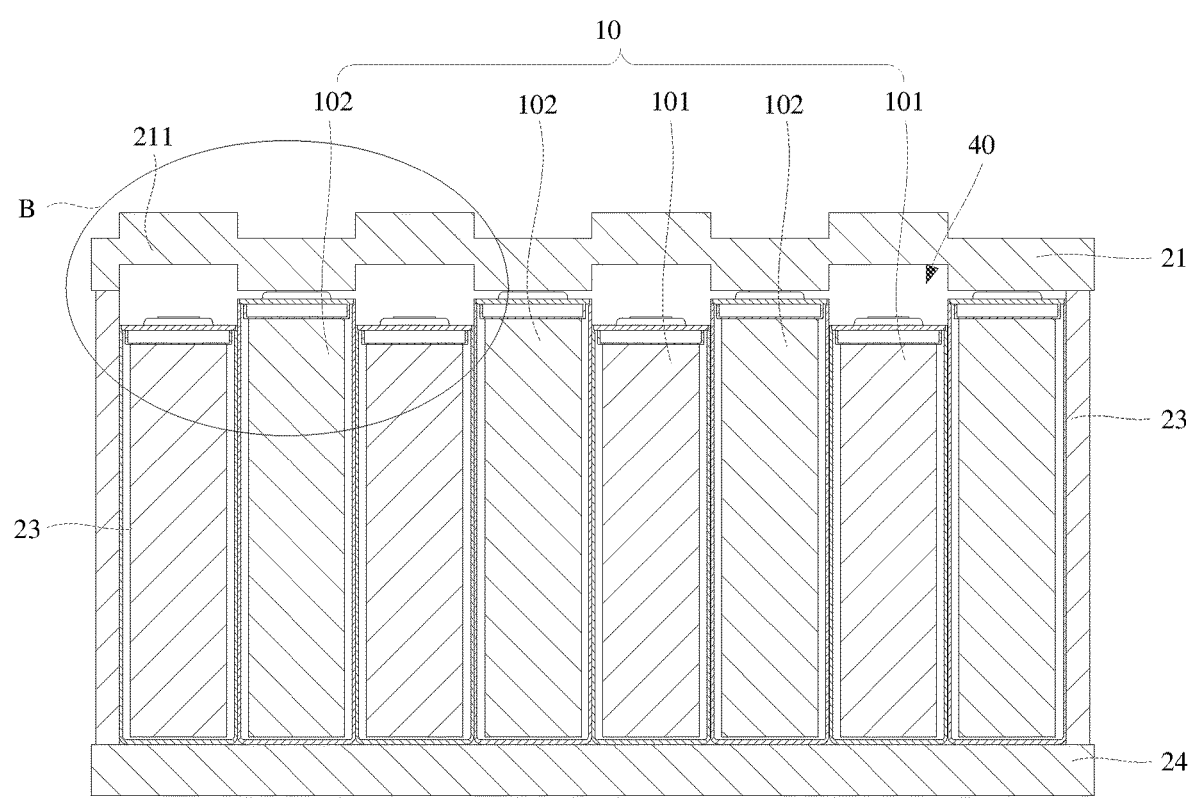
FIG. 8 is a third schematic structural diagram of a battery according to an embodiment of this application.
Figure 9:
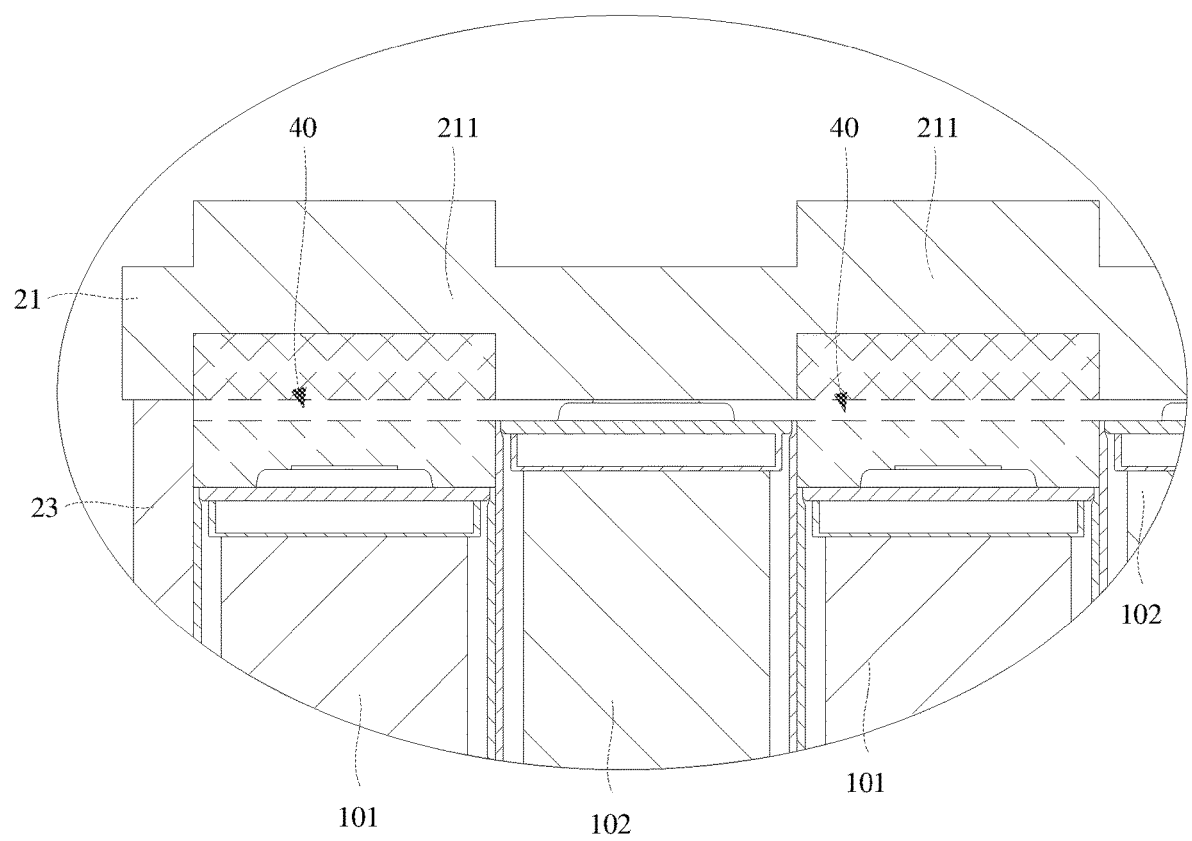
FIG. 9 is a schematic structural diagram of portion B in FIG. 8.
Figure 10:
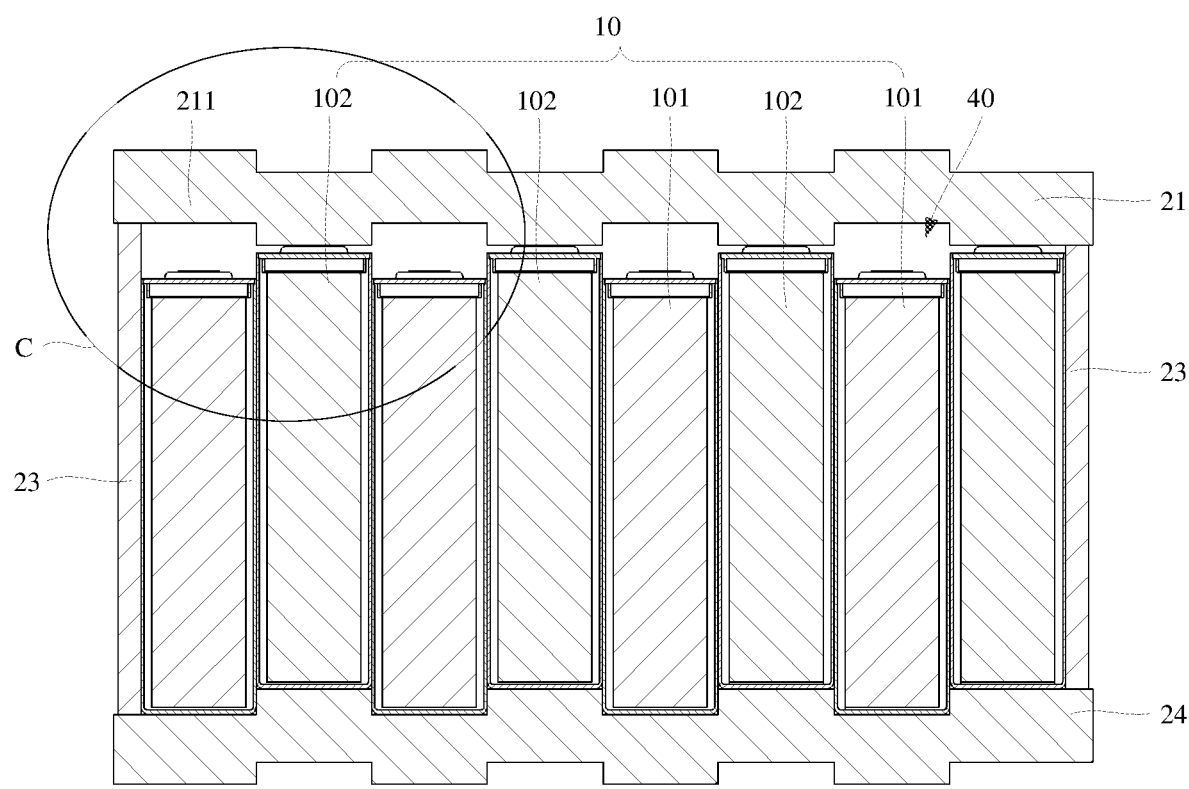
FIG. 10 is a fourth schematic structural diagram of a battery according to an embodiment of this application.
Figure 11:
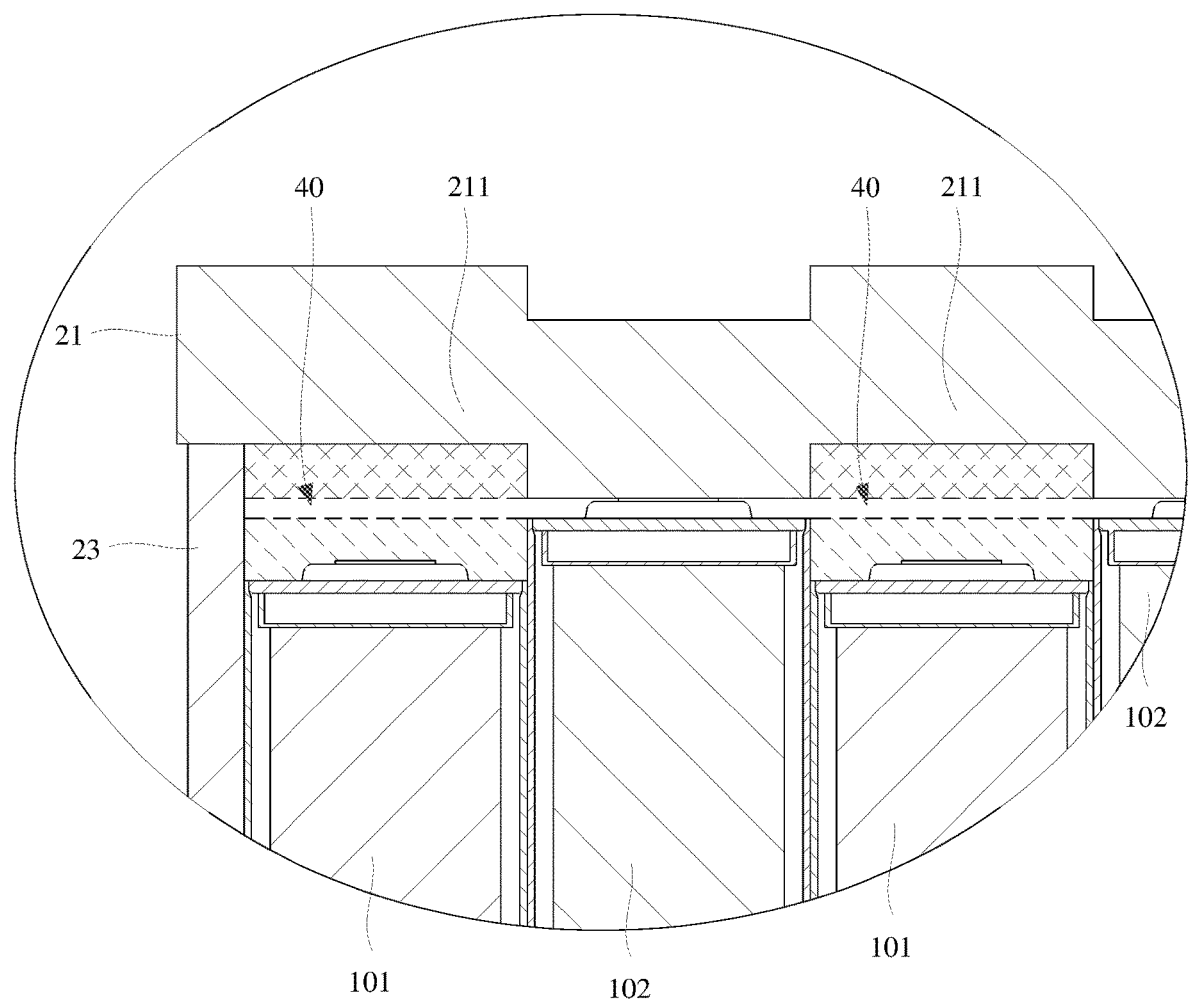
FIG. 11 is a schematic structural diagram of portion C in FIG. 10.

FIG. 2 is a first schematic structural diagram of a battery disclosed in an embodiment of this application. FIG. 3 is an exploded view of the battery shown in FIG. 2. FIG. 4 is a schematic structural diagram of a battery cell in FIG. 3, with a pressure relief mechanism located at the top. FIG. 5 is a schematic structural diagram of a battery cell in FIG. 3, with a pressure relief mechanism located at the bottom. FIG. 6 is a second schematic structural diagram of a battery disclosed in an embodiment of this application. FIG. 7 is a schematic structural diagram of portion A in FIG. 6. FIG. 8 is a third schematic structural diagram of a battery disclosed in an embodiment of this application. FIG. 9 is a schematic structural diagram of portion B in FIG. 8. FIG. 10 is a fourth schematic structural diagram of a battery disclosed in an embodiment of this application. FIG. 11 is a schematic structural diagram of portion C in FIG. 10.

Referring to FIG. 2 to FIG. 11, in some optional embodiments, the battery 1 includes a plurality of battery cells 10, where at least one of the battery cells 10 is provided with a pressure relief mechanism 14, and optionally, each battery cell 10 is provided with a pressure relief mechanism 14. The pressure relief mechanism 14 is configured to actuate release of internal pressure of the battery cell 10 when the internal pressure or internal temperature of the battery cell 10 reaches a threshold; and a protective box 20, where the protective box 20 is configured to protect the plurality of battery cells 10, and the protective box 20 is provided with a guiding channel 40, where the guiding channel 40 is configured to guide emissions released from the pressure relief mechanism 14; where the plurality of battery cells 10 include a first battery cell 101 and a second battery cell 102 that are arranged adjacently, the first battery cell 101 includes a pressure relief end at which the pressure relief mechanism 14 is provided, and the pressure relief end of the first battery cell 101 is staggered with one end of the second battery cell 102 that is close to the pressure relief end in a direction leaving the guiding channel 40, so as to increase a volume of the guiding channel 40.

Specifically, referring to FIG. 2 to FIG. 5, the battery 1 includes a plurality of battery cells 10, where the battery cell 10 may have a structure well known to persons skilled in the art. The battery cell 10 in the application may include a lithium-ion secondary battery, a lithium-ion primary battery, a lithium-sulfur battery, a sodium lithium-ion battery, a sodium-ion battery, a magnesium-ion battery, or the like. This is not limited in this embodiment of this application. The battery cell 10 may be of a cylindrical shape, a flat shape, a cuboid shape, or other shapes. This is not limited in this embodiment of this application either. The battery cells 10 are typically divided into three types by packaging method: cylindrical battery cell, square battery cell, and soft pack battery cell. This is not limited in this embodiment of this application either.

As shown in FIG. 4 and FIG. 5, the battery cell 10 typically includes an electrode assembly 11 and an electrolyte (not shown). The electrode assembly 11 includes a positive electrode plate, a negative electrode plate, and a separator disposed between the positive electrode plate and the negative electrode plate. Operation of the battery cell 10 mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. An electrode current collector uncoated with the positive electrode active substance layer bulges out of an electrode current collector coated with the positive electrode active substance layer, and the electrode current collector uncoated with the positive electrode active substance layer is used as a positive tab 111. Using the lithium-ion battery as an example, a material of the positive electrode current collector may be aluminum, and the positive electrode active substance may be lithium cobalt oxide, lithium iron phosphate, ternary lithium, lithium manganate oxide, or the like. The negative electrode plate includes a negative electrode current collector and a negative electrode active substance layer. The negative electrode active substance layer is applied on a surface of the negative electrode current collector. An electrode current collector uncoated with the negative electrode active substance layer bulges out of an electrode current collector coated with the negative electrode active substance layer, and the electrode current collector uncoated with the negative electrode active substance layer is used as a negative tab 112. A material of the negative electrode current collector may be copper, and the negative electrode active substance may be carbon, silicon, or the like. To ensure that no fuse blows as a large current flows, a plurality of positive tabs 111 are stacked together, and a plurality of negative tabs 112 are stacked together. A material of the separator may be polypropylene (PP) or polyethylene (PE), or the like. In addition, the electrode assembly 11 may have a wound structure or a laminated structure, and the number of the electrode assembly 11 may be one or more. This is not specifically limited in this embodiment of this application.

The battery cell 10 further includes a housing 15. The electrode assembly 11 and the electrolyte are both sealed in the housing 15. The housing 15 may be a hollow cuboid, cube, or cylinder. A material of the housing 15 may be aluminum or steel and alloys thereof, or plastic, or aluminum-plastic film. The housing 15 is also provided with a positive electrode terminal 12 and a negative electrode terminal 13, where the positive tab 111 is electrically connected to the positive electrode terminal 12, and the negative tab 112 is electrically connected to the negative electrode terminal 13, so as to output electrical energy. The housing 15 is also provided with the pressure relief mechanism 14. The pressure relief mechanism 14 may be disposed in any position of the housing 15. For example, the pressure relief mechanism 14 may be disposed on the top (as shown in FIG. 4), the bottom (as shown in FIG. 5), or a side (not shown) of the housing 15, or the pressure relief mechanism 14 may be disposed between the positive electrode terminal 12 and the negative electrode terminal 13. This is not specifically limited in this embodiment of this application, as long as the internal pressure of the monomer 10 can be released.

The pressure relief mechanism 14 means a component or part that can actuate release of internal pressure of the battery cell 10 when the internal pressure or internal temperature of the battery cell reaches a threshold. The pressure relief mechanism 14 may specifically take a form of an explosion-proof valve, a gas valve, a pressure relief valve, a safety valve, or the like, and may specifically use a pressure sensitive or temperature sensitive component or structure. To be specific, when internal pressure or temperature of the battery cell 10 reaches the threshold, the pressure relief mechanism 14 performs an action or a weak structure provided in the pressure relief mechanism 14 is destroyed, thereby forming an opening or channel for relief of the internal pressure. The threshold in this application may be a pressure threshold or a temperature threshold. The design of the threshold varies according to different design requirements. For example, the threshold may be designed or determined based on the internal pressure or internal temperature of a battery cell 10 that is considered to be dangerous or at risk of being out of control. Moreover, the threshold may depend on, for example, materials used for one or more of the positive electrode plate, negative electrode plate, electrolyte, and separator in the battery cell 10.

"Actuate" mentioned in this application means that the pressure relief mechanism 14 implements an action or is activated to a given state, so that the internal pressure of the battery cell 10 can be relieved. The action implemented by the pressure relief mechanism 14 may include but is not limited to, for example, cracking, breaking, tearing, or opening at least part of the pressure relief mechanism 14. When the pressure relief mechanism 14 is actuated, high-pressure and high-temperature substances inside the battery cell are released from an actuated part as emissions. In this way, the battery cell 10 can discharge its pressure under a condition of controllable pressure or temperature, thereby avoiding more serious potential accidents. The emissions from the battery cell 10 mentioned in this application include but are not limited to: electrolyte, fragments of positive and negative electrode plates and separator because of dissolution or breaking, high-temperature and high-pressure gas and flames generated by reactions, and the like. The high-temperature and high-pressure emissions are released toward a side of the battery cell at which the pressure relief mechanism 14 is provided, and may be more specifically released toward a region where the pressure relief mechanism 14 is actuated. The strength and destructive power of such emissions are probably great, even great enough to break one or more parts in that direction.

The plurality of battery cells 10 are arranged side by side, and the plurality of battery cells 10 are connected in series and parallel as predetermined through a bus component (not shown). In this way, a current produced by the battery cells 10 can be derived through the bus component to supply electric power to an apparatus.

The plurality of battery cells 10 may be divided into a plurality of groups, and each group of battery cells 10 is separately packaged to form a battery module, and a plurality of battery modules are packaged again to form the battery 1. Optionally, the plurality of battery cells 10 may alternatively be directly packaged to form the battery 1. Forms of packaging of the battery 1 are not limited in this embodiment of this application.

Using prismatic cells as an example, a plurality of prismatic cells may be directly packaged in the protective box 20 to form the battery 1. The protective box 20 may include a protective plate 21, four side plates 23, and a base plate 24, where the protective plate 21, the four side plates 23, and the base plate 24 are connected and surround the outer sides of the plurality of battery cells 10. A material of the protective box 20 may be metal, plastic, or the like.

The guiding channel 40 is formed inside the protective box 20, to prevent the emissions from being released out of the protective box 20, that is, to prevent the emissions from causing harm to a surrounding environment and a human user when the battery 1 ruptures.

As shown in FIG. 3, the battery 1 has an arrangement direction X, a width direction Y, and a height direction Z, where the arrangement direction X, the width direction Y and the height direction Z are perpendicular to each other.

The pressure relief mechanism 14 may be provided at any end of the battery cell 10 in the height direction Z or at any end in the width direction Y. When the pressure relief mechanisms 14 of a plurality of battery cells 10 are located at different positions, the number of guiding channels 40 may be one or more.

To increases a volume of the guiding channel 40, the plurality of battery cells 10 include at least two battery cells 10 that are staggered. Referring to FIG. 6 to FIG. 11, using the guide channel 40 provided at the top of the first battery cell 101 in the height direction Z as an example, the pressure relief mechanism 14 of the first battery cell 101 is provided at the top of the first battery cell 101 in the height direction Z, the top of the first battery cell 101 in the height direction Z is a pressure relief end of the first battery cell 101, and the pressure relief mechanism 14 of the second battery cell 102 can be provided at any end of the second battery cell 102 in the height direction Z or any end in the width direction Y. Optionally, the second battery cell 102 may be provided with no pressure relief mechanism 14. In this case, that the first battery cell 101 and the second battery cell 102 are staggered means that the top of the first battery cell 101 in the height direction Z and away from the guiding channel 40 is staggered with respect to the top of the second battery cell 102 in the height direction Z. In this way, the increased part of volume of the guiding channel 40 is surrounded by the following wall surfaces: the top surface of the first battery cell 101 and two side surfaces of the two second battery cells 102 adjacent to the first battery cell 101, that is, the portion filled with oblique lines, either dotted or solid, in FIG. 7, FIG. 9, and FIG. 11.

It can be understood that when the first battery cell 101 is adjacent to a side plate 23, the increased part of volume of the guiding channel 40 is surrounded by the following surfaces: the top surface of the first battery cell 101, the side surface of the second battery cell 102 adjacent to the first battery cell 101, and inner surface of the side plate 23.

A size of the increased part of volume of the guiding channel 40 may be adjusted by adjusting a height difference between the top of the first battery cell 101 in the height direction Z and the top of the second battery cell 102 in the height direction Z.

It can be understood that when the pressure relief mechanism 14 of the second battery cell 102 is not provided at the top along the height direction Z, the battery 1 further includes another guiding channel 40. For example, the pressure relief mechanism 14 of the second battery cell 102 is provided at one end of the second battery cell 102 in the width direction Y. That the first battery cell 101 and the second battery cell 102 are staggered may further include that the second battery cell 102 is staggered with respect to the first battery cell 101 in the width direction Y, so as to increase the volume of the guiding channel 40.

In other words, when the battery 1 is provided with a plurality of guiding channels 40, the first battery cell 101 and the second battery cell 102 are staggered, as long as the volume of any one or more guiding channels 40 can be increased.

In this embodiment of this application, the volume of the guiding channel 40 is increased to allow passage of a larger volume of emissions. In this way, the battery 1 has a larger relief buffer space in the protective box 20, and offers better safety performance.

In some optional embodiments, the bus component and the pressure relief mechanism 14 of the battery cell 10 may be located at the same end of the battery cell 10, or at different ends of the battery cell 10.

When the bus component and the pressure relief mechanism 14 of the battery cell 10 are located at the same end of the battery cell 10, still referring to FIG. 6 to FIG. 11, the pressure relief mechanism 14 of the first battery cell 101 is located at the top in the height direction Z, and the bus component is disposed at the top of the first battery cell 101 in the height direction Z. In this case, this embodiment does not limit a position of the pressure relief mechanism 14 of the secondary battery cell 102. In addition, the battery 1 provided in this embodiment has at least the guiding channel 40 provided at the top of the first battery cell 101.

Specifically, the protective box 20 includes a protective plate 21, the protective plate 21 is spaced apart from the plurality of battery cells 10, and the guiding channel 40 is formed between the protective plate 21 and the plurality of battery cells 10.

To further improve the relief buffer space and safety performance of the battery 1, referring to FIG. 8 to FIG. 11, the protective plate 21 is provided with a recess 211, and the recess 211 is configured to increase the volume of the guiding channel 40. The recess 211 formed by recessing the protective plate 21 toward a side that faces away from the plurality of battery cells 10. The recess 211 has an inner chamber, and the inner chamber is configured to communicate with the guiding channel 40.

Specifically, the protective plate 21 is plate-shaped, and the recess 211 is recessed toward a side that faces away from the battery cell 10. In this way, the protective plate 21 is recessed toward the battery cell 10 to form the recess 211, the inner chamber of the recess 211 communicates with the guiding channel 40, and the volume of the guiding channel 40 further increases. The part of increase is the inner chamber of the recess 211, that is, the rectangular portion filled with dotted lines, as shown in FIG. 9 and FIG. 11. This allows passage of a larger volume of emissions, further improving the relief buffer space and safety performance of the battery 1.

The recess 211 may be arranged opposite any battery cell 10. The number of recesses 211 may be one or more. This is not limited in this embodiment.

In some optional embodiments, the recess 211 may be arranged opposite a battery cell 10 that produces a large amount of gas or has a larger volume of emissions to release. For example, the recess 211 is opposite the first battery cell 101. In this way, three parts of the guiding channel 40 may correspond to the first battery cell 101, which are a zone enclosed by the top surface of the first battery cell 101 and two side surfaces of the two second battery cells 102 adjacent to the first battery cell 101 (the portion filled with oblique lines, either dotted or solid, in FIG. 7, FIG. 9, and FIG. 11), the guiding channel 40, and the inner chamber of the recess 211 (the rectangular portion filled with dotted lines in FIG. 9 and FIG. 11). In this case, the guiding channel 40 at the position corresponding to the first battery cell 101 has a larger space, and the emissions can smoothly enter the guiding channel 40. This reduces an impact of the emissions on an inner wall of the guiding channel 40, ensuring a better safety performance of the battery 1.

In some optional embodiments, the pressure relief mechanisms 14 of all battery cells 10 may all be located at the top in the height direction Z. In this case, the battery 1 is provided with one guiding channel 40, and the battery 1 has a relatively compact structure.

In some optional embodiments, the bus component and the pressure relief mechanism 14 of the first battery cell 101 may both be located at the bottom of the first battery cell 101 in the height direction Z or any end in the width direction Y. This structure is similar to that in the foregoing embodiment. Details are not described herein again.

When the bus component and the pressure relief mechanism 14 of the battery cell 10 are located at different ends of the battery cell 10, the structure is similar to that in the foregoing embodiment. Details are not described herein again.

Figure 12:
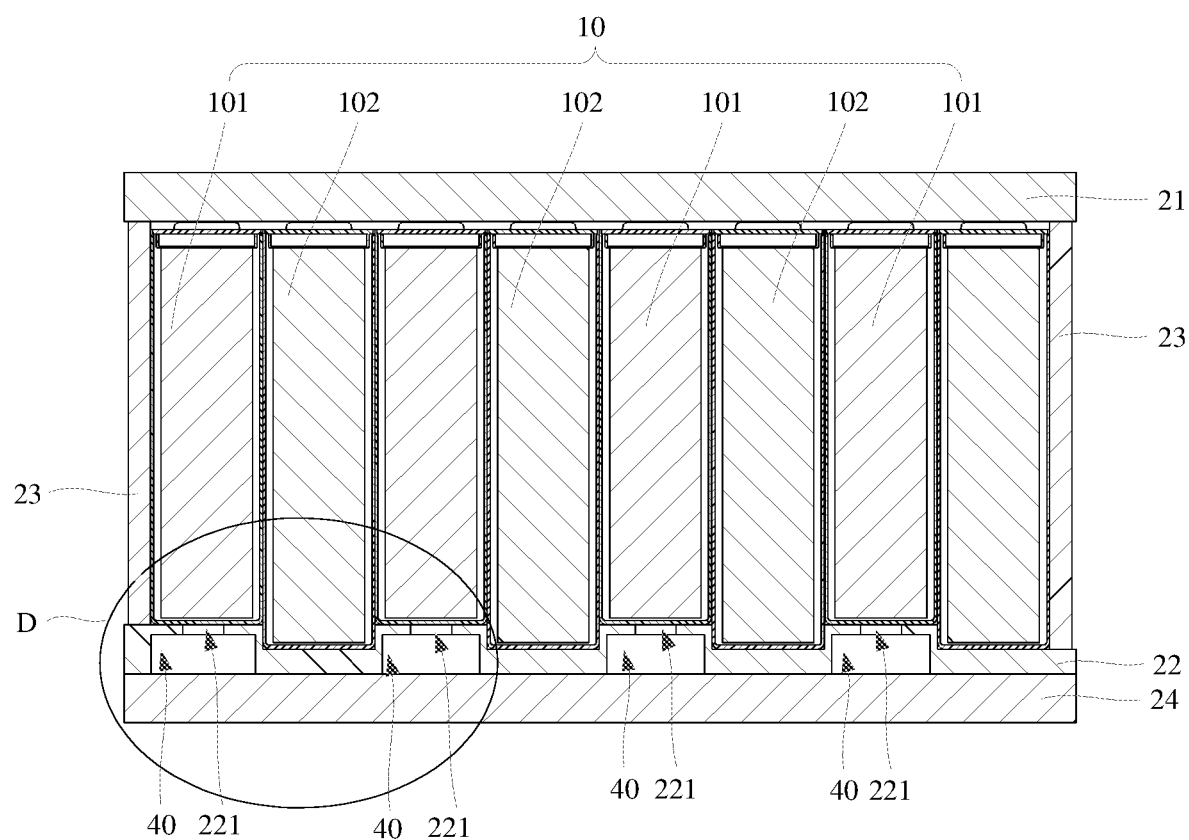
FIG. 12 is a fifth schematic structural diagram of a battery according to an embodiment of this application.
Figure 13:
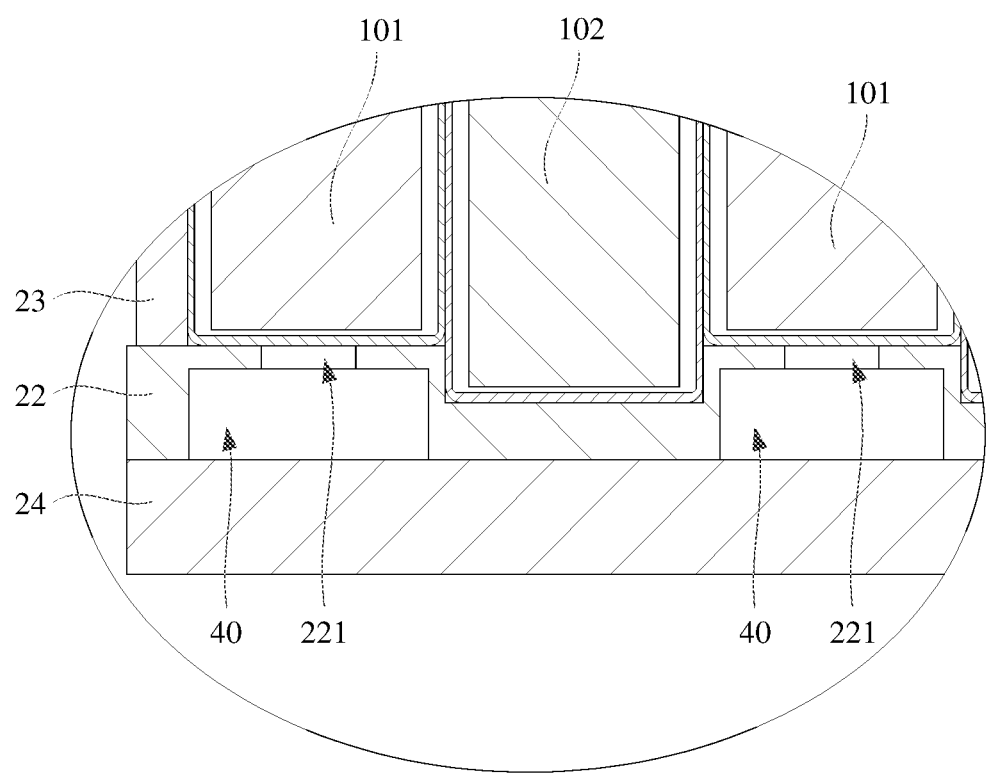
FIG. 13 is a schematic structural diagram of portion D in FIG. 12.

FIG. 12 is a fifth schematic structural diagram of a battery according to an embodiment of this application. FIG. 13 is a schematic structural diagram of portion D in FIG. 12.

Referring to FIG. 12 to FIG. 13, the pressure relief mechanism 14 of the first battery cell 101 is located at the bottom in the height direction Z, and the bus component is disposed at the top of the first battery cell 101 in the height direction Z. In this case, this embodiment does not limit a position of the pressure relief mechanism 14 of the secondary battery cell 102. For example, the pressure relief mechanism 14 of the second battery cell 102 may be provided at the bottom or top of the second battery cell 102 in the height direction Z. In this case, the battery 1 provided in this embodiment has at least the guiding channel 40 provided at the bottom of the first battery cell 101.

The protective box 20 further includes a supporting plate 22. The supporting plate 22 is located at the bottom of the first battery cell 101 in the height direction Z, and is attached to the plurality of battery cells 10. The guiding channel 40 is provided on one side of the supporting plate 22 away from the plurality of battery cells 10. In other words, the guiding channel 40 is formed between the supporting plate 22 and a base plate 24 of the protective box 20, to prevent the emissions from being released out of the protective box 20.

In order to release the emissions of the first battery cell 101, the supporting plate 22 is provided with through holes 221 for passage of the emissions, and the through holes 221 communicate with the guiding channel 40. The through hole 221 may be arranged opposite the pressure relief mechanism 14 of the first battery cell 101, helping emissions to enter the guiding channel 40 directly through the through hole 221, allowing smoother release of the emissions.

The shape of the through hole 221 is adapted to the shape of the pressure relief mechanism 14. For example, the through hole 221 may be a round hole, a square hole, and an oblong hole.

Depending on different positions of the pressure relief mechanism 14 of the second battery cell 102, bottoms of the first battery cell 101 and the second battery cell 102 in the height direction Z may be flush or staggered, as long as the guiding channel 40 can be formed at the position corresponding to the first battery cell 101.

In this case, to increases the volume of the guiding channel 40, the bottom of the first battery cell 101 in the height direction Z may be staggered with respect to the bottom of the second battery cell 102 in the height direction Z, and the bottom of the first battery cell 101 in the height direction Z is located between two ends of the second battery cell 102. This increases the volume of the guiding channel 40, so that the battery 1 has a larger relief buffer space in the protective box 20, which allows passage of a larger volume of emissions, ensuring better safety performance the battery 1.

The height difference between the bottom of the first battery cell 101 in the height direction Z and the bottom of the second battery cell 102 in the height direction Z is directly proportional to the volume increase of the guiding channel 40. The height difference rises with the volume increase of the guiding channel 40. The height difference can be set as required.

For example, referring to FIG. 12, when the pressure relief mechanism 14 of the second battery cell 102 is not provided at the bottom in the height direction Z, the zone of the supporting plate 22 corresponding to the second battery cell 102 may be in contact with the base plate. In this case, during an assembly process of the battery 1, the first battery cell 101 and the second battery cell 102 are staggered at the bottom in the height direction Z, so that the guiding channel 40 is formed under the first battery cell 101. In this embodiment, to increases a volume of the guiding channel 40, the height difference between the bottom of the first battery cell 101 in the height direction Z and the bottom of the second battery cell 102 in the height direction Z may be increased.

As for the supporting plate 22 and base plate 24, when the pressure relief mechanism 14 is provided at the bottom of the battery cell 10 in the height direction Z, the protective box 20 is further provided with a supporting plate 22, where the supporting plate 22 is configured to support the plurality of battery cells 10. When the pressure relief mechanisms 14 of the plurality of battery cells 10 are all located at the top in the height direction Z, the plurality of battery cells 10 can be directly connected to the base plate 24 of the protective box 20, where the base plate 24 is configured to support the plurality of battery cells 10.

When the plurality of battery cells 10 are flush at the bottom in the height direction Z, the side surfaces, in contact with the plurality of battery cells 10, of the supporting plate 22 or base plate 24 are flat (as shown in FIG. 6 and FIG. 8). When the plurality of battery cells 10 are staggered at the bottom in the height direction Z, the side surfaces, in contact with the plurality of battery cells 10, of the supporting plate 22 or base plate 24 are concave or convex surfaces (as shown in FIG. 10 and FIG. 12).

Still referring to FIG. 10, when the first battery cell 101 and the second battery cell 102 are staggered at the bottom in the height direction Z, a recessed supporting portion is provided on the base plate 24, and the bottom of the first battery cell 101 in the height direction Z can extend into and provided support in the supporting portion, so that the bottom of the first battery cell 101 is inserted into the supporting portion, and the bottom of the first battery cell 101 is fixed relative to the base plate 24. In this way, the first battery cell 101 is comparatively stable, and the battery 1 is well fastened.

Specifically, the bottom surface of the first battery cell 101 is in contact with the bottom surface of the supporting portion, and the side surface of the first battery cell 101 is in contact with the side surface of the supporting portion. In this way, the inner surface of the supporting portion forms a limit to the bottom of the first battery cell 101. Even if the first battery cell 101 is squeezed by a neighboring battery cell 10, for example, the second battery cell 102 is displaced and squeezes the first battery cell 101. In this case, only the part, extending out of the supporting portion, of the first battery cell 101 is displaced, and the part, located in the supporting portion, of the first battery cell 101 is still clamped to the supporting portion. Therefore, the first battery cell 101 is well fastened. The battery 1 offers relatively good stability as a whole.

It can be understood that when the base plate 24 is provided with the recessed supporting portion, the base plate 24 is also provided with a corresponding protruding portion, where the second battery cell 102 may be supported by the protruding portion.

The protruding portion may be fastened to or integrally formed with the base plate 24. Referring to FIG. 10, the base plate 24 may be a plate structure, the protruding portion is connected to the base plate 24, and the protruding portion jointly forms a concave-convex supporting surface with the base plate 24. In this way, the base plate 24 is highly strong. Moreover, an outer surface of the base plate 24 is flat, facilitating mounting of the battery 1 to an apparatus.

Certainly, when the supporting plate 22 is provided with a recessed supporting portion, a principle of clamping the supporting plate 22 to the battery cell 10 is similar to a principle of clamping the base plate to the battery cell 10. Details are not described herein again.

Figure 14:
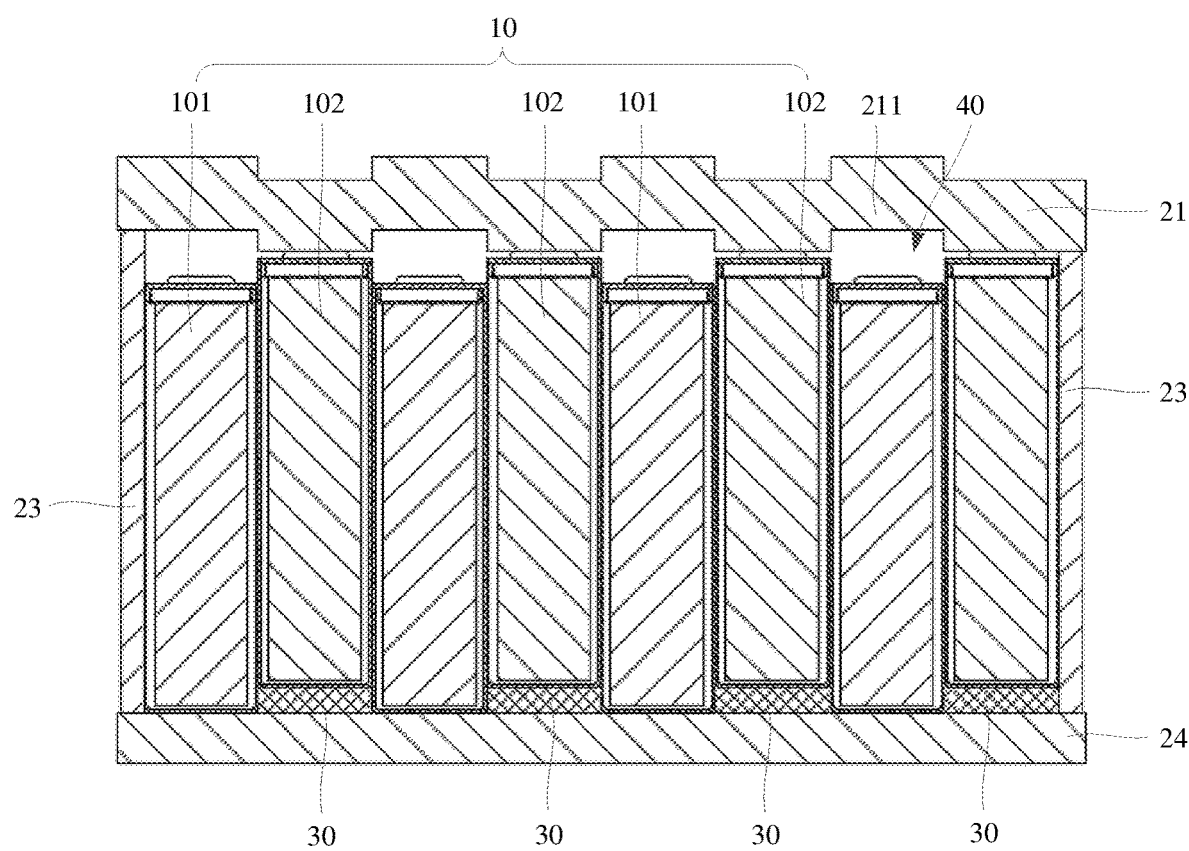
FIG. 14 is a sixth schematic structural diagram of a battery according to an embodiment of this application.

FIG. 14 is a sixth schematic structural diagram of a battery according to an embodiment of this application. Referring to FIG. 14, in some optional embodiments, the battery 1 further includes an elastic member 30, where the elastic member 30 is connected to the base plate 24, and is configured to support the battery cells 10. This can improve shock absorption and impact resistance of the battery cells 10 and the battery 1. The elastic member 30 may be a spring, elastic rubber, or the like. This is not limited in this embodiment.

Each battery cell 10 may be correspondingly provided with one elastic member 30, so as to buffer each battery cell 10 separately.

In order to fix the elastic member 30, an accommodating groove (not shown) is provided in the base plate 24, and the accommodating groove is configured to accommodate the elastic member 30. In this way, when the battery 1 is subjected to impact, the battery cell 10 is displaced with respect to the base plate 24, the elastic member 30 may elastically deform in the accommodating groove. The accommodating groove can play a guiding role to prevent skewing of the battery cell 10 because of skewing of the elastic member 30 during the deformation.

The number of accommodating grooves may be less than the number of battery cells 10, so as to avoid strength of the base plate 24 being weakened by excessive accommodating grooves.

Certainly, when the protective box 20 is provided with a supporting plate 22, the elastic member 30 is connected to the supporting plate 22. Details are not described herein again.

In some optional embodiments, the first battery cell 101 and the second battery cell 102 may be identical or different battery cells. Herein, being "identical" means that the first battery cell 101 and the second battery cell 102 are essentially the same in terms of chemical system, shape, size, volume, mass, energy density, and the like, and being "different" means that the first battery cell 101 and the second battery cell 102 have a significant difference in at least one of the chemical system, shape, size, volume, mass, energy density, and the like.

In some optional embodiments, an energy density of the first battery cell 101 is greater than an energy density of the second battery cell 102, where energy density means the amount of energy released by a battery per unit mass or unit volume, that is, gravimetric energy density or volumetric energy density. In some optional embodiments, the energy density of the first battery cell 101 is 1.1 to 1.6 times the energy density of the second battery cell 102. With the energy density of the first battery cell 101 being greater than the energy density of the second battery cell 102, a larger volume of emissions is generated when the pressure relief mechanism 14 of the first battery cell 101 is actuated. Increasing the volume of the guiding channel 40 opposite the first battery cell 101 helps release the emissions more smoothly.

In some optional embodiments, the first battery cell 101 may be a ternary lithium battery cell, specifically, for example, a lithium nickel manganese cobalt oxide (LiNiMn-CoO$_2$, NCM) battery cell or a lithium nickel cobalt aluminum oxide (LiNiCoAlO$_2$, NCA) battery cell, and the second battery cell 102 may be a lithium iron phosphate (LiFePO$_4$, LFP) battery cell or a lithium cobalt oxide (LiCoO$_2$) battery cell.

In some optional embodiments, the number of first battery cells 101 and that of second battery cells 102 are not limited in the embodiments of this application. The number of first battery cells 101 and that of second battery cells 102 may be set as required. For example, one first battery cell 101 and one second battery cell 102 may be provided. One first battery cell 101 and a plurality of second battery cells 102 may be provided. Certainly, a plurality of first battery cells 101 and a plurality of second battery cells 102 may be provided.

When the first battery cell 101 and the second battery cell 102 are both provided in plurality, the first battery cells 101 and the second battery cells 102 are arranged alternately with n first battery cells 101 and m second battery cells 102, where n≥1, m≥1, and n and m are both integers.

In other words, this embodiment does not limit arrangements of the first battery cell 101 and the second battery cell 102. For example, three first battery cells 101, two second battery cells 102, and four first battery cells 101 may be arranged in sequence.

Optionally, the first battery cells 101 and the second battery cells 102 may be arranged in alternate turn. To be specific, a first battery cell 101 is adjacent to second battery cells 102 on both sides, and a second battery cell 102 is adjacent to first battery cells 101 on both sides. In this way, the first battery cells 101 with higher emissions and the second battery cells 102 with lower emissions are arranged alternately. This can avoid accumulation of excessive emissions in a particular zone of the guiding channel 40, facilitating an even distribution of the emissions of the first battery cell 101 and the emissions of the second battery cell 102 in the guiding channel 40, so that stress is evenly distributed in the guiding channel 40, ensuring good safety performance of the battery 1.

An embodiment of this application further provides a preparation method of battery 1. The method is used for preparing the battery 1 and includes:

S100. Provide a plurality of battery cells 10, and arrange the plurality of battery cells 10 in parallel along the arrangement direction X, where at least one of the battery cells 10 is provided with a pressure relief mechanism 14, and the plurality of battery cells 10 include a first battery cell 101 and a second battery cell 102 that are arranged adjacently.

S200. Provide a protective box 20.

S300. Install the plurality of battery cells 10 in the protective box 20, and form a guiding channel 40 in the protective box 20. When the pressure relief mechanism 14 is actuated, an interior of the battery cell 10 is able to communicate with the guiding channel 40.

S400. Stagger a pressure relief end of the first battery cell 101 and one end of the second battery cell 102 that is close to the pressure relief end. This increases the volume of the guiding channel 40, providing a larger space for accommodating emissions in the guiding channel 40. In this way, the battery 1 has a larger relief buffer space and offers better safety performance.

An embodiment of this application further provides a preparation device of battery 1, used for preparing the battery 1, and including: a battery cell preparation module, configured to prepare the plurality of battery cells 10, where at least one of the battery cells 10 is provided with a pressure relief mechanism 14, and the plurality of battery cells 10 include a first battery cell 101 and a second battery cell 102 that are arranged adjacently; a protective box preparation module, configured to prepare the protective box 20; an assembly module, configured to install the plurality of battery cells 10 in the protective box 20, where a pressure relief end of the first battery cell 101 is staggered with one end of the second battery cell 102 that is close to the pressure relief end.

The battery cell preparation module, protective box preparation module, and assembly module may be separate from each other, or each be a component of the preparation device of battery. This is not limited in this embodiment.

Specifically, during preparation of the battery 1, the battery cells 10 and the protective box 20 are prepared by the battery cell preparation module and the protective box preparation module, and the guiding channel 40 is formed in the protective box 20.

During an assembly process of the battery 1 or before an assembly process of the battery 1, all battery cells 10 may be arranged side by side, so that the assembly module may accommodate the plurality of battery cells 10 arranged side by side in the protective box 20. Then the pressure relief end of the first battery cell 101 is staggered with the one end of the second battery cell 102 that is close to the pressure relief end. This increases the volume of the guiding channel 40, providing a larger space for accommodating emissions in the guiding channel 40. In this way, the battery 1 has a larger relief buffer space and offers better safety performance.

Although this application has been described with reference to some preferred embodiments, various modifications can be made to this application and equivalent replacements can be made to the components herein without departing from the scope of this application. In particular, as long as there is no structural conflict, the various technical features mentioned in the embodiments can be combined in any manner. This application is not limited to the specific embodiments disclosed in this specification, but includes all technical solutions falling within the scope of the claims.

What is claimed is:

1. A battery comprising:
    a protective box provided with a first guiding channel and a second guiding channel; and
    a plurality of battery cells stacked in the protective box in a stacking direction and each having a height direction and a width direction perpendicular to each other and both perpendicular to the stacking direction, the plurality of battery cells including:
        a first battery cell including a terminal end and a non-terminal end opposite each other in the height direction, a positive electrode terminal and a negative electrode terminal of the first battery cell being provided at the terminal end of the first battery cell, the non-terminal end of the first battery cell having no electrode terminal, one of the terminal end and the non-terminal end being a pressure relief end in the height direction, the pressure relief end being provided with a first pressure relief mechanism, and the first pressure relief mechanism being configured to actuate release of internal pressure of the first battery cell in response to the internal pressure or an internal temperature of the first battery cell reaching a threshold; and a second battery cell adjacent to the first battery cell and including a terminal end and a non-terminal end opposite each other in the height direction, a positive electrode terminal and a negative electrode terminal of the second battery cell being provided at the terminal end of the second battery cell, the non-terminal end of the second battery cell having no electrode terminal, the second battery cell including a pressure relief side in the width direction, the pressure relief side being provided with a second pressure relief mechanism, and the second pressure relief mechanism being configured to actuate release of internal pressure of the second battery cell in response to the internal pressure or an internal temperature of the second battery cell reaching the threshold; wherein:

the first guiding channel is configured to guide emissions released from the first pressure relief mechanism, and the second guiding channel is configured to guide emissions released from the second pressure relief mechanism; and the pressure relief end of the first battery cell is staggered with one end of the second battery cell that is close to the pressure relief end, in a direction leaving the first guiding channel, and the pressure relief side of the second battery cell is staggered with one side of the first battery cell that is close to the pressure relief side, in a direction leaving the second guiding channel, wherein:

the pressure relief end of the first battery cell is the terminal end of the first battery cell and the one end of the second battery cell that is close to the pressure relief end is the terminal end of the second battery cell; or the pressure relief end of the first battery cell is the non-terminal end of the first battery cell and the one end of the second battery cell that is close to the pressure relief end is the non-terminal end of the second battery cell.

2. The battery according to claim 1, wherein: the protective box comprises a protective plate spaced apart from the plurality of battery cells, and the first guiding channel and second guiding channels are formed between the protective plate and the plurality of battery cells; and the protective plate is provided with a recess recessing toward a side of the protective plate that faces away from the plurality of battery cells, and an inner chamber of the recess is configured to communicate with the first and second guiding channels.

3. The battery according to claim 2, wherein the recess is opposite the first battery cell.

4. The battery according to claim 1, wherein: the protective box comprises a supporting plate attached to the plurality of battery cells; the first and second guiding channels are provided on one side of the supporting plate away from the plurality of battery cells; and the supporting plate is provided with through holes communicating with the first and second guiding channels and for the emissions to pass through.

5. The battery according to claim 1, wherein an energy density of the first battery cell is greater than an energy density of the second battery cell.

6. The battery according to claim 5, wherein the energy density of the first battery cell is 1.1 to 1.6 times the energy density of the second battery cell.

7. The battery according to claim 1, wherein:
the first battery cell is one of a plurality of first battery cells;
the second battery cell is one of a plurality of second battery cells; and
the plurality of first battery cells and the plurality of second battery cells are arranged alternately.

8. An apparatus comprising the battery according to claim 1, wherein the battery provides electrical energy for the apparatus.

9. The battery of claim 4, wherein: the protective box further comprises a base plate facing at least one outer side of the plurality of battery cells; the supporting plate is provided between the base plate and the plurality of battery cells; and the first and second guiding channels is provided between the supporting plate and the base plate.

10. The battery of claim 1, wherein in a staggering direction in which the pressure relief end of the first battery cell is staggered with respect to the end of the second battery cell that is close to the pressure relief end, a size of the first battery cell is smaller than a size of the second battery cell.

* * * * *